Oct. 15, 1968   P. A. RUBEL   3,406,055
WELDING METHOD FOR CURED POLYMERIC COMPOSITIONS
Filed May 20, 1965
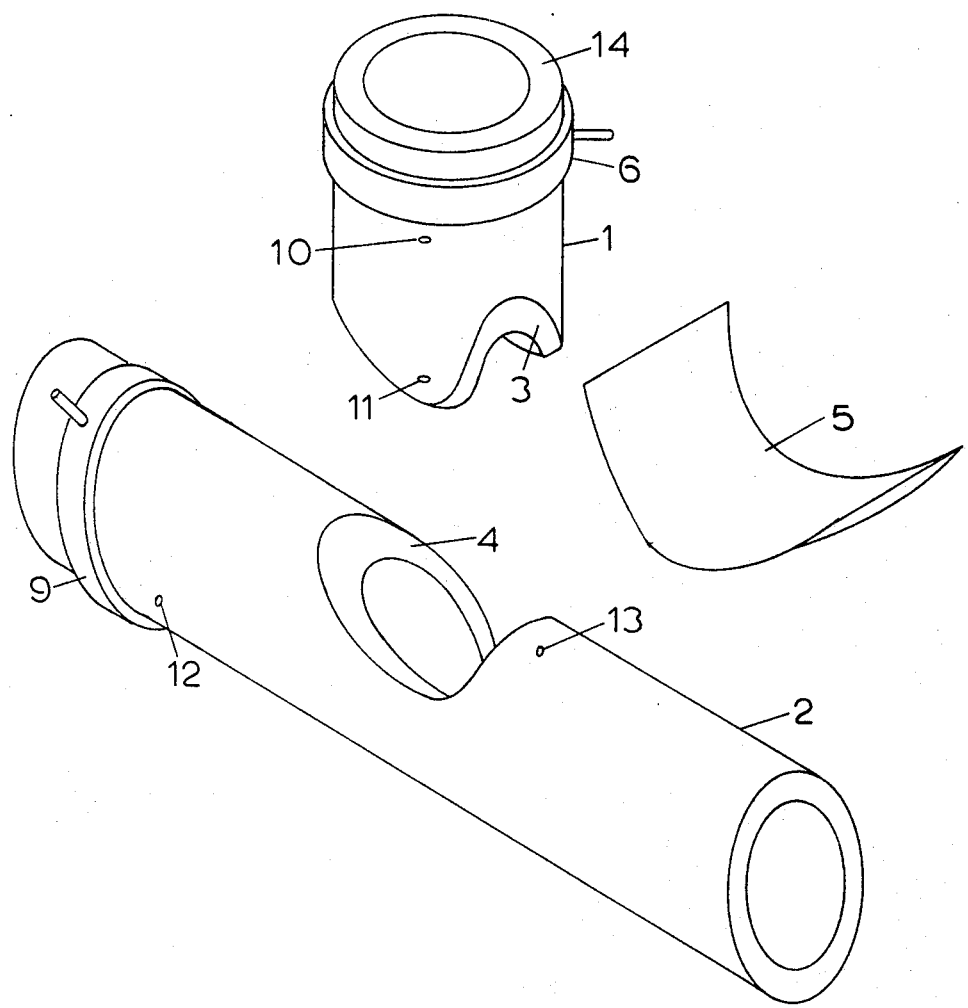
P. A. RUBEL
INVENTOR.
BY

United States Patent Office 3,406,055
Patented Oct. 15, 1968

3,406,055
WELDING METHOD FOR CURED POLYMERIC COMPOSITIONS
Peter A. Rubel, Lexington, Mass., assignor to Cabot Corporation, Boston, Mass., a corporation of Delaware
Filed May 20, 1965, Ser. No. 457,448
14 Claims. (Cl. 156—275)

The present invention relates to a novel process for welding cured polymeric compositions and more particularly to an improved process for the electrical resistance welding of cured polymeric compositions.

The use of articles comprising cured polymeric compositions has risen greatly in the past years and has attained a position of significant industrial importance. Cured or "cross-linked" polymeric compositions in general exhibit improved characteristics of flexibility, impact strength, percent elongation at yield, thermal stability, chemical resistance, etc., over similar compositions which are uncured. In particular, articles comprising carbon black-filled cured olefinic polymers and copolymers have been found to be especially valuable.

One of the problems which users of formed articles comprising cured polymeric compositions have heretofore encountered was a lack of a suitable method for joining said articles. Said problem has been found to be particularly acute when the articles to be joined are cylindrical or rod-shaped structures such as pipe, tubing or rodstock. Although said structures can generally be threaded and relatively suitable threaded fittings provided therefor, the threaded joint technique tends to be expensive and, moreover, is subject to leaks, thread failure and a host of other problems. The development of a suitable welding technique would therefore constitute not only a more economically attractive joining technique but also would provide the inherent advantages of an essentially continuous piping system.

Several techniques have been developed for welding uncured polymeric compositions which techniques have not been altogether satisfactory when applied to cured compositions. One of said techniques relates particularly to olefinic polymer and copolymer compositions comprising a relatively high loading of an electrically conductive filler, such as carbon black. In its broadest terms, said technique comprises (a) contacting the surfaces to be joined and (b) flowing an electric current through the articles in the vicinity of said surfaces. The heat generated by the internal resistance of the composition ultimately causes the composition to flux thereby welding the articles along the contacting surfaces. Said method of welding has a number of disadvantages when applied to cured polymeric compositions. Firstly, as the composition heats, the articles often soften to the extent that deformation thereof occurs a substantial distance from the weld line. Secondly, it is generally extremely difficult to achieve substantially perfect contact of the surfaces to be welded and when excellent contact is not achieved, the electrical current applied during the welding operation often arcs over minor voids and faults in the weld line and renders the weld defective. In accordance with the present invention, however, these problems have been totally overcome.

It is a principal object of the present invention to provide a novel process for resistance welding cured polymeric compositions.

It is another object of the present invention to provide an improved process for resistance welding articles comprising filled and cured polymeric compositions without substantial deformation of said articles.

Other objects and advantages of the present invention will in part be obvious and will in part appear hereinafter.

The above and other objects of the present invention are achieved when cured polymeric compositions comprising an electrically conductive filler are welded by (1) heating the surfaces to be joined above the softening temperature thereof, (2) interposing between said surfaces a suitable heat curable adhesive, (3) joining said surfaces with the adhesive therebetween, and (4) flowing sufficient electrical current through the vicinity of said surfaces to cure said adhesive and form a weld.

The term "cured polymeric composition" refers in general to any cured or "cross-linked" polymer or copolymer but in particular to cured polymers (and copolymers) of $\alpha$-mono-olefinic hydrocarbons such as polyethylene, polypropylene, ethylene/butene-1 copolymers, ethylene/propylene copolymers and mixtures thereof comprising an electrically conductive filler in the amount of between about 20 and about 500 parts per hundred by weight of the polymer.

Generally, any finely-divided electrically conductive solid can comprise the filler material. For instance, finely-divided or powdered metals and metal alloys such as copper, iron, nickel, chrome/nickel, aluminum, iron/nickel and the like are suitable. Preferred, however, are carbon blacks such as thermal black, acetylene black, oil furnace black, gas furnace black and channel black. Especially preferred as fillers are the more electrically conductive carbon blacks such as acetylene black and conductive furnace blacks and mixtures thereof.

The method by which the curing of said polymer (or copolymer) is accomplished is not critical and many methods are known to the art. For instance, curing can be accomplished by gamma or ultraviolet irradiation of the polymer or by thermal activation of a suitable curing agent previously dispersed in the uncured polymer such as an organic peroxide. In any case it is important that (a) the polymer or copolymer be cured, and (b) the composition comprise between about 20 and about 500 parts per hundred by weight of the polymer of an electrically conductive filler.

A better understanding of the present invention can be had when reference is made to the drawing forming part hereof wherein there is illustrated a typical system arrangement for welding pipe to form a T joint in accordance with the process of the invention.

Referring now to the drawing, weld line surfaces 3 and 4 and pipe portions 1 and 2 comprising a cured composition of a polymer of an olefinic hydrocarbon containing an electrically conductive filler are prepared. Said surfaces are heated to temperatures above the softening point of said cured composition. Next, heat curable adhesive 5 is interspersed between the surfaces to be joined and the cured articles are brought into position and contacted so as to provide a weld line. An electric current is then allowed to pass through electrode 6, pipe portion 1, through the weld line, pipe portion 2, electrode 9 and thence to ground.

In accordance with the typical welding operation dicussed above, surfaces 3 and 4 and adhesive 5 are preheated to the extent that curing and bonding of the adhesive to surfaces 3 and 4 results without arcing or substantial heating of the remainder of the pipe portions between the electrodes. This last mentioned effect is a most surprising and advantageous aspect of our invention. In prior art resistance welding processes relating to uncured polymeric compositions, substantial portions of the composition within which current flows often tend to heat to the extent that softening and deformation of said composition occurs at a substantial distance from the intended weld line.

Heat curable adhesives suitable for use in the process of the present invention generally comprise any thermally activatable curing agent. Many thermally activatable curing agents are known to the art and are suitable. For instance, one class of curing agent which is suitable comprises organic peroxides and said class is generally preferred. Specific examples of suitable organic peroxides are: di-α-cumyl peroxide; tert-butyl-α-cumyl peroxide; tert-butyltriphenyl methyl peroxide; decanoyl peroxide; caprylyl peroxide; benzoyl peroxide and many of the other peroxides presently known to the art, for example the peroxides disclosed in U.S. Patents Nos. 2,888,424 and 2,628,214 and in an article by Mageli, O., Evaluation of Organic Peroxides From Half-Life Data, page 10, Lucidol Div., Wallace Tiernan Inc.

Also suitable for use as curing agents are the quinone oximes and the quinone oxime derivatives disclosed in copending U.S. applications 247,346 and 247,374 now Patent No. 3,264,252 of D. B. Smith and J. C. MacKenzie, filed Dec. 26, 1962, and the curing agents disclosed in U.S. Patent 3,093,614.

Although the curing agents described above can be utilized alone as the adhesive, it is much preferred that the adhesive comprise an essentially uncured polymer containing above about 20 parts per hundred parts by weight of said polymer of an electrically conductive filler and between about 0.5 and about 10 parts per hundred of a thermally activatable curing agent of the types previously described. Although any essentially uncured polymer of an α-mono-olefinic hydrocarbon or mixture thereof can be utilized, it is generally preferable that said polymer be of the same general type as that contained in the cured composition to be welded with the exception, of course, that said polymer be uncured. Thus, when articles comprising a cured polyethylene composition are to be welded, an adhesive comprising uncured polyethylene is generally preferred.

It should be noted that it is well known that often during dispersion of the curing agent into the polyolefin polymer there is sufficient heat generated to cause partial activation of said curing agent and thus partial curing of the polymer. However, said curing is generally of a minor nature and does not normally markedly change the flow characteristics of the polymer melt. Therefore, the term "essentially uncured" appearing in the above discussion refers to a polymer having substantial flow characteristics.

It is pointed out again that the adhesive must be at least somewhat electrically conductive; consequently said adhesive should comprise at least 20 parts per hundred by weight of the polymer of an electrically conductive filler, preferably carbon black. It is further preferred when carbon black is the filler that between about 50 parts and about 120 parts per hundred by weight of polymer of carbon black be utilized. Concentrations of electrically conductive filler above about 120 parts, for instance 175 parts, are also useful, but will not normally be utilized because when carbon black is the filler, the viscosity of an adhesive comprising above about 120 parts per hundred of black tends to be greater than is normally desirable for good flow properties of the adhesive. The conductive blacks as described previously are also normally preferred.

It is desirable that the surfaces to be welded be "wet" with the adhesive during the welding operation, thus it is much preferred to choose a curing agent which has an active curing temperature range which is at least slightly above the softening temperature of the adhesive composition. For instance, for a polyethylene adhesive composition which softens at about 135° C., a curing agent having an active decomposition temperature above about 145° C. is preferred.

The physical form of the adhesive when applied to or interspersed between the surfaces to be welded is generally not critical. For instance, said adhesive can be applied to said surfaces in a finely granular or powdered form or as a solution. However, it is generally convenient to utilize the adhesive as a sheet or film of suitable thickness (comprising the polymer, filler and curing agent), merely sandwiching said sheet or film between the surfaces forming the weld line.

Prior to application of the adhesive and formation of the weld line, however, it is important that the weld line surfaces be heated to above the softening temperature of the cured polymeric composition. The temperatures required will generally vary depending to a great extent on the nature of the cured composition and the type and amount of conductive filler present therein. For instance, the softening temperature of a cured high density polyethylene composition comprising about 100 parts per hundred parts by weight of the polyethylene of a carbon black filler is normally between about 125 and 145° C. In any case, the softening temperature of the cured composition can easily be determined.

The heating of the surfaces to be joined can be accomplished by any suitable means and to any desired depth. Usually, however, depending somewhat upon the physical bulk of the articles involved, the depth to which heating to above the softening temperature is accomplished need not exceed about ½ inch. Preferably, when articles of relatively low bulk are involved such as thin wall tubing, said heating is restricted to a depth of between about 1/16 inch and about 3/16 inch. Although any method of heating said surfaces is generally suitable, such as direct flame impingement thereon, conductive methods of heating such as contacting the surfaces with a hot iron or mold contoured to fit said surfaces is generally convenient and easily controlled.

Having heated the surfaces to be joined to above the softening temperature of the cured composition, the adhesive is applied or interspersed and the weld line formed. Said weld line formation is preferably accomplished under pressure in order that substantially complete contact between the surfaces and the adhesive be achieved. The amount of pressure required for any particular case will normally vary and is not normally critical.

Although electric current can be applied immediately following formation of the weld line it is normally desirable, particularly when, as preferred, an adhesive comprising a polymer of an α-mono-olefinic hydrocarbon is utilized, that a period of time be allowed to pass before application of the current which will at once be sufficient to allow the adhesive to at least partially flux and/or "wet" the weld line surfaces, but will not be so lengthy as to allow substantial cooling of said surfaces to occur. Said period of time can best be determined for each particular case during operations.

Electric current is applied through the cured parts to the weld line. The amount of current/unit time utilized, i.e., the power should be sufficient to heat the adhesive to above the active temperature of the curing agent, thereby effecting curing and bonding of said adhesive to each of the surfaces. The voltages incurred depend to a large extent upon the electrical resistivity of the cured compositions involved, the electrical resistivity of the adhesive, the temperatures of the weld line surfaces and the adhesive, and the like. Said parameters are in turn dependent upon the filler loading, type of filler, type of polymers or copolymers, amount of curing agent present in the adhesive, etc. In a system comprising substantially fully cured high density polyethylene having about 120 parts per hundred by weight of a carbon black filler dispersed therein, and an adhesive comprising about 100 parts of uncured high density polyethylene, about 100 parts of acetylene black and about 4 parts of di-α-cumyl peroxide curing agent, the surfaces to be joined being at a temperature of about 180° C., electric power of about 0.30 kw. per square inch of surface to be joined at about 80 volts average is normally sufficient to complete the weld in from about 0.25 to about 2 minutes. Obviously, greater electrical power can be utilized to obtain correspondingly shorter times; however, in the above system at above about 0.40 kw. per square inch of surface arcing can occur. Obviously, care should also be taken not to ground the cured thermoplastic composition during the resistance welding step other than through the desired current pathway.

Also, although many of the benefits of the present process can be achieved without maintaining the weld line surfaces and the adhesive under pressure, such pressure from the moment of contact thereof through a cooling period following the welding operation is definitely preferred. Many methods are available and are well known in the art for accomplishing and maintaining the welding under pressure and therefore further discussion here is unnecessary.

There follow a number of illustrative non-limiting examples:

Example 1

Two pieces of a cured, carbon black filled polyethylene pipe having an I.D. of about 2 inches and an O.D. of about 3 inches are cut and notched as shown in FIGURE 1. Said pipe comprises, by weight about 100 parts cured high density (.960) polyethylene and about 120 parts of an oil furnace carbon black. Thermocouples 10, 11, 12 and 13 are inserted into the pipe at the indicated points in FIGURE 1, thermocouple 11 being about ¼ inch from the apex of the point formed by the pipe. Next, an adhesive film 5 of about 0.025 inch thickness comprising a dispersion of about 100 parts polyethylene, about 100 parts of acetylene black and about 4.0 parts of di-α-cumyl peroxide is placed between surfaces 3 and 4 to be welded and the pieces are brought together. An air powered ram device is lowered on surface 14 at a pressure of about 500 lbs. and is thereafter maintained at said pressure until the welding cycle is completed. Next, an electric current is flowed between electrodes 6 and 9 at a power of about 200 watts for about two minutes. During this period the thermocouples are monitored at thirty second intervals, the results of which are shown in Table I below. After about one minute it is noted that arcing occurs over the weld line near thermocouple 11 and buckling of portions of the pipe walls adjacent said arcing occurs.

TABLE I

| Seconds | $T_{10}$ (° C.) | $T_{11}$ (° C.) | $T_{12}$ (° C.) | $T_{13}$ (° C.) |
|---|---|---|---|---|
| 0 | 25 | 25 | 25 | 25 |
| 30 | 29 | 95 | 34 | 95 |
| 60 | 46 | 170 | 41 | 170 |
| 90 | 74 | 220 | 68 | 195 |
| 120 | 100 | 330 | 95 | 220 |

Example 2

This example is essentially a duplicate of Example 1 with the exception that prior to mating of the joint, surfaces 3 and 4 are heated to a temperature of about 170° C. to a depth of approximately ⅛ inch. Substantially immediately after said heating of surfaces 3 and 4, adhesive film 5 is emplaced and the joint is mated as in Example 1 under a ram pressure of about 500 lbs. About 0.5 minute thereafter, the electric current is applied. After two minutes of current flow, no arcing and no substantial deformation of the pipe has occurred. Table II below illustrates the thermocouple readings at 30 second intervals from the onset of current flow.

TABLE II

| Seconds | $T_{10}$ (° C.) | $T_{11}$ (° C.) | $T_{12}$ (° C.) | $T_{13}$ (° C.) |
|---|---|---|---|---|
| 0 | 35 | 145 | 30 | 150 |
| 30 | 35 | 190 | 31 | 190 |
| 60 | 36 | 195 | 32 | 205 |
| 90 | 36 | 215 | 32 | 215 |
| 120 | 37 | 215 | 32 | 215 |

It is not known precisely why the preheating step results in heating substantially only of the weld line when the electric current is flowed therethrough. It is thought, although there is no intent to be bound by this explanation, that the resistivity of cured polymeric compositions comprising conductive fillers, and particularly carbon black fillers, is temperature dependent. Thus, when a portion of a cured polymeric composition is heated, the electrical resistivity of the heated portion is increased. This phenomenon, then, predisposes said heated portion to selective heating when electrical energy is passed therethrough as compared to unheated portions which have a lower resistivity.

Obviously, many changes can be made in the above description and examples without departing from the scope of the invention.

For instance, cured compositions comprising polymers of α-olefinic hydrocarbons other than ethylene, for instance comprising polypropylene, ethylene-propylene copolymers and the like can be welded by the process of the present invention.

Moreover, any conductive filler can be utilized either in the cured compositions to be welded or in the heat curable adhesive. However, carbon blacks such as thermal blacks, channel blacks and furnace blacks have been found to be excellent conductive fillers for the purposes of the present invention and are, therefore, preferred.

What is claimed is:
1. A process for welding cured polymeric compositions comprising a cured polymeric material and between about 20 parts and about 500 parts per hundred parts by weight of said material of an electrically conductive filler, which comprises:
   (a) heating the surfaces to be welded to above the softening temperatures thereof;
   (b) interposing between said surfaces an adhesive composition comprising a thermally activatable curing agent;
   (c) contacting said surfaces with said adhesive composition; and
   (d) flowing sufficient electrical current through said cured compositions and said adhesive to activate said adhesive.
2. The process of claim 1 wherein said surfaces are heated to above the softening temperature thereof to a depth of between about 1/16 inch and about ½ inch.
3. The process of claim 1 wherein said thermally activatable curing agent is an organic peroxide.
4. The process of claim 1 wherein after the said surfaces are contacted with said adhesive, said surfaces are continually urged together through the remainder of the welding cycle.
5. The process of claim 1 wherein said cured polymeric compositions comprise (a) cured polymeric material chosen from the group consisting of polymers, copolymers and mixtures thereof of α-mono-olefinic hydrocarbons, and (b) carbon black.
6. The process of claim 5 wherein said cured polymeric material is polyethylene.
7. The process of claim 5 wherein said carbon black is chosen from the group consisting of acetylene black, conductive furnace blacks and mixtures thereof.
8. The process of claim 1 wherein said adhesive composition comprises (a) an essentially uncured polymeric material, (b) above about 20 parts by weight of said polymeric material of an electrically conductive filler, and (c) between about 0.5 and about 10 parts per hundred parts by weight of said polymeric material of a thermally activatable curing agent.
9. The process of claim 8 wherein said uncured polymeric material is chosen from the group consisting of polymers, copolymers and mixtures thereof of α-mono-olefinic hydrocarbons.
10. The process of claim 9 wherein said uncured polymeric material is polyethylene.
11. The process of claim 8 wherein said electrically conductive filler is carbon black and is present in the amount of between about 50 parts and about 120 parts per hundred parts by weight of said uncured polymeric material.

12. The process of claim 11 wherein said carbon black is chosen from the group consisting of acetylene black, conductive furnace blacks and mixtures thereof.

13. The process of claim 8 wherein said thermally activatable curing agent is an organic peroxide having an active decomposition temperature substantially greater than the softening temperature of said uncured polymeric material.

14. The process of claim 8 wherein after said surfaces are contacted with said adhesive composition and prior to the flowing of said electric current, a sufficient interval of time is allowed to elapse to at least partially flux said adhesive composition.

No references cited.

DOUGLAS J. DRUMMOND, *Primary Examiner.*